United States Patent [19]

Kluser

[11] Patent Number: 5,265,998
[45] Date of Patent: Nov. 30, 1993

[54] FASTENING ELEMENT FOR THE MOUNTING OF INSULATING STRIPS AND/OR PLATES ON A SOLID SUBSTRUCTURE

[75] Inventor: Remo Kluser, Altstätten, Switzerland

[73] Assignee: SFS Stadler Holding AG, Heerbrugg, Switzerland

[21] Appl. No.: 671,758

[22] PCT Filed: May 28, 1990

[86] PCT No.: PCT/EP90/00853
§ 371 Date: May 13, 1991
§ 102(e) Date: May 13, 1991

[87] PCT Pub. No.: WO91/01420
PCT Pub. Date: Feb. 7, 1991

[30] Foreign Application Priority Data

Jul. 14, 1989 [AT] Austria ................ 1720/89

[51] Int. Cl.⁵ .............. F16B 15/02; F16B 15/08; E04B 5/00
[52] U.S. Cl. ................... 411/480; 411/384; 411/451; 411/531; 52/410; 52/512
[58] Field of Search .............. 411/383, 384, 531, 533, 411/387, 396, 480; 52/410, 512

[56] References Cited

U.S. PATENT DOCUMENTS

| | | | |
|---|---|---|---|
| 4,452,023 | 6/1984 | Stahlberg | 411/531 X |
| 4,881,861 | 11/1989 | Hewison | 411/383 |
| 4,909,691 | 3/1990 | Bogel | 411/533 X |
| 5,122,022 | 6/1992 | Kluser | 411/384 |

FOREIGN PATENT DOCUMENTS

| | | | |
|---|---|---|---|
| 286706 | 10/1988 | European Pat. Off. | 411/384 |
| 2617911 | 9/1977 | Fed. Rep. of Germany | |
| 2807606 | 10/1978 | Fed. Rep. of Germany | |
| 3515734 | 11/1986 | Fed. Rep. of Germany | 411/383 |
| 3539752 | 5/1987 | Fed. Rep. of Germany | 411/383 |
| 1359860 | 6/1972 | United Kingdom | |

Primary Examiner—Neill R. Wilson
Attorney, Agent, or Firm—Helfgott & Karas

[57] ABSTRACT

Fastening element for mounting insulating strips or plates on a solid structure includes a large-surface washer, a tubular extension and a locking member which is mounted to an end portion of the fastener and protrudes into the extension so that the fastener and the tubular extension form two telescopic elements movable relative to each other. The two telescopic elements can be adjusted and locked relative to each other in a desired position due to the provision of interengaging ribs, grooves or corrugations formed on the telescopic elements.

23 Claims, 5 Drawing Sheets

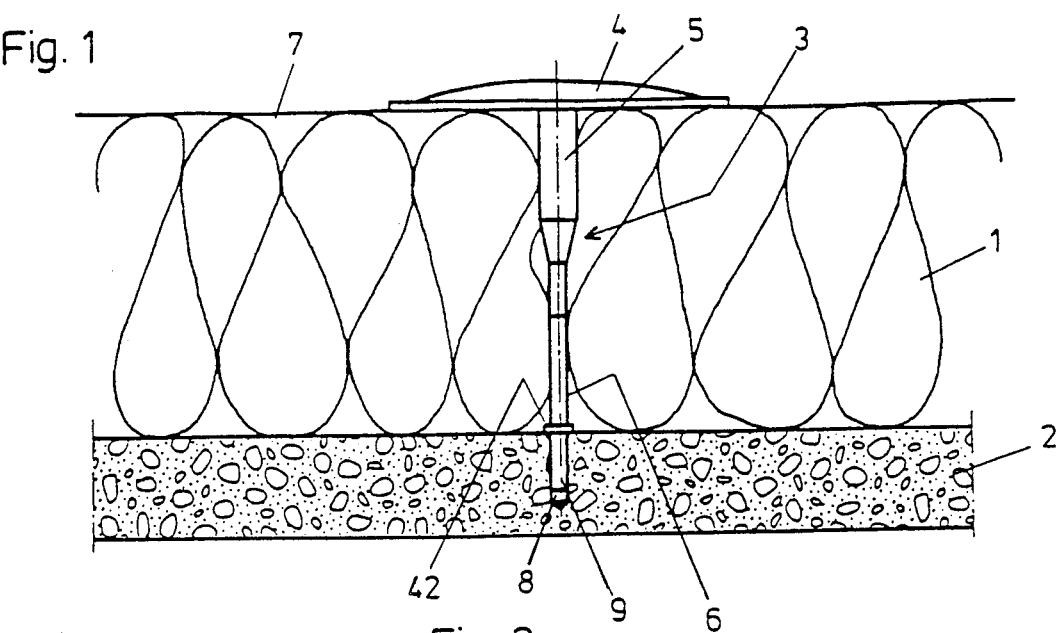
Fig. 1
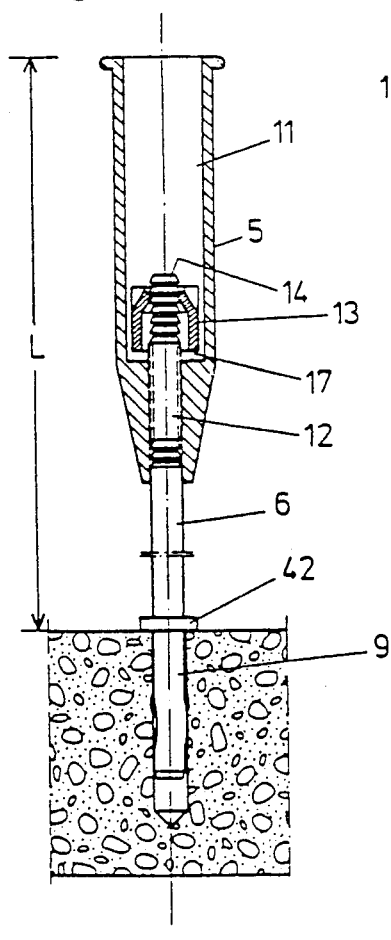
Fig. 2
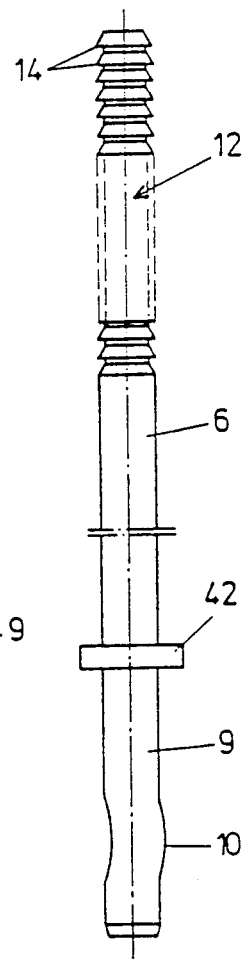
Fig. 3
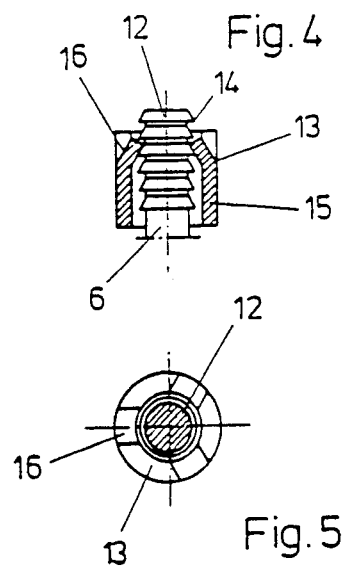
Fig. 4
Fig. 5

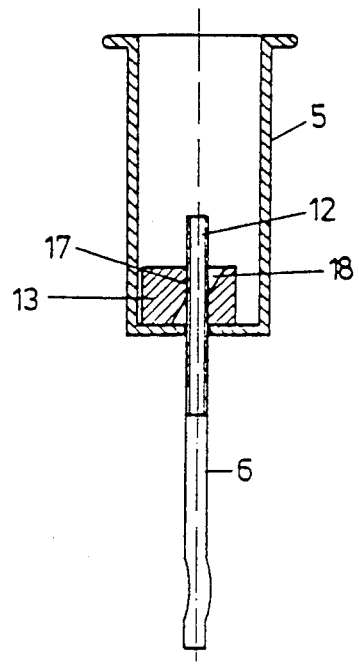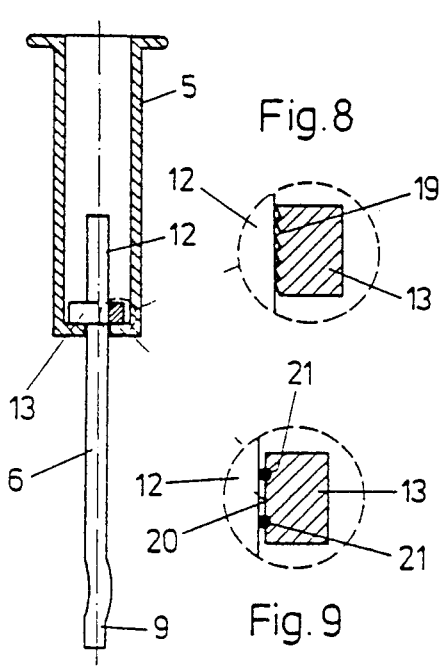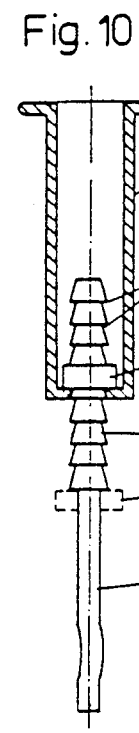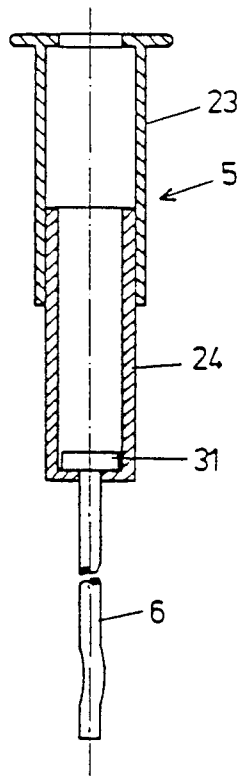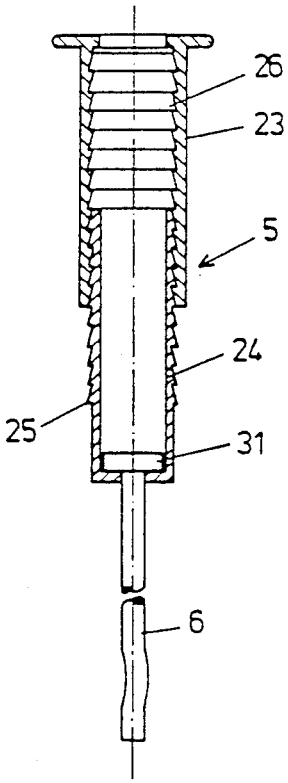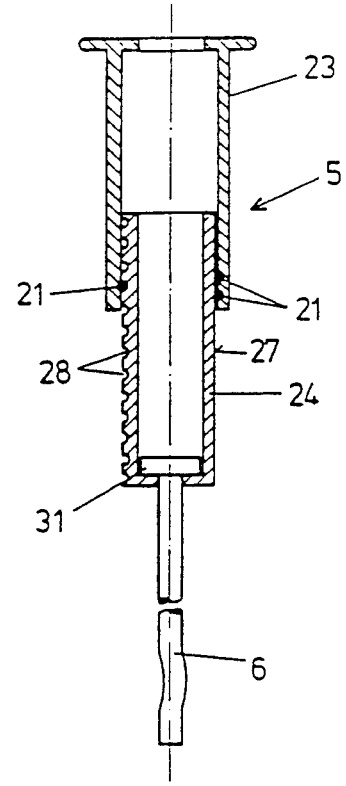

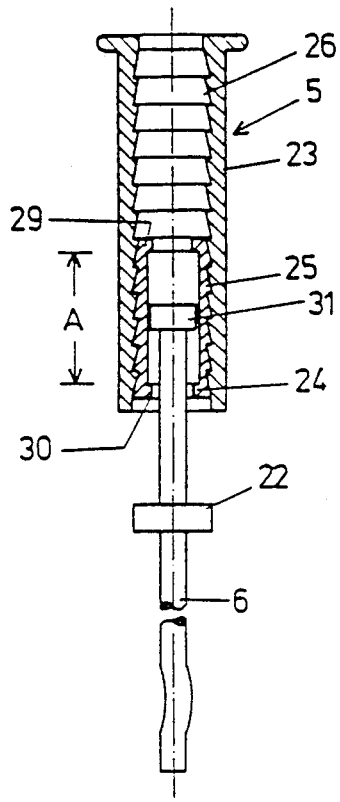
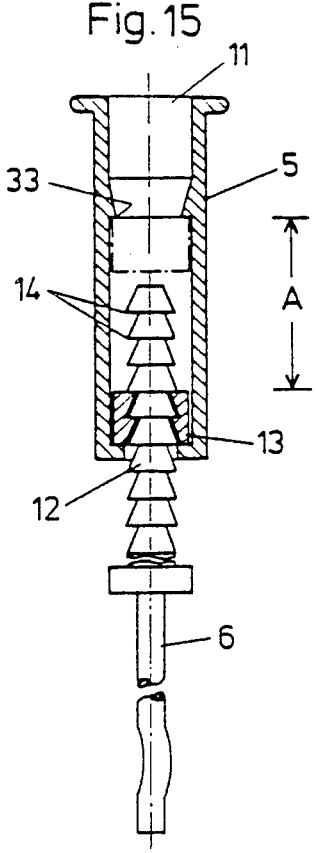
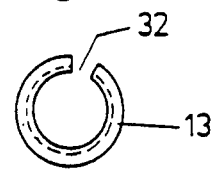
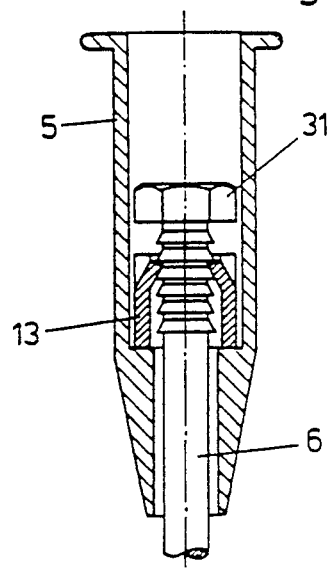
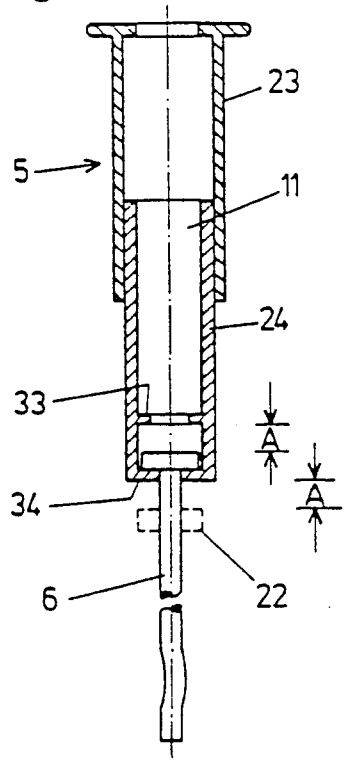
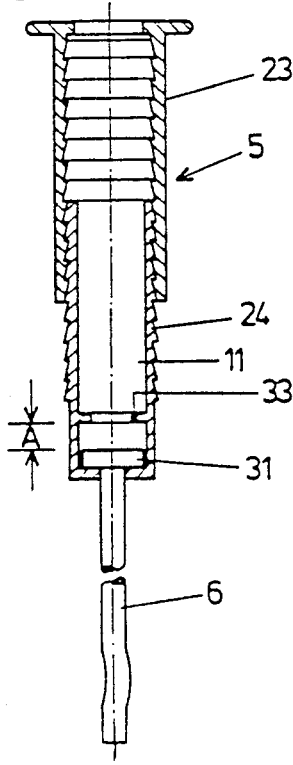
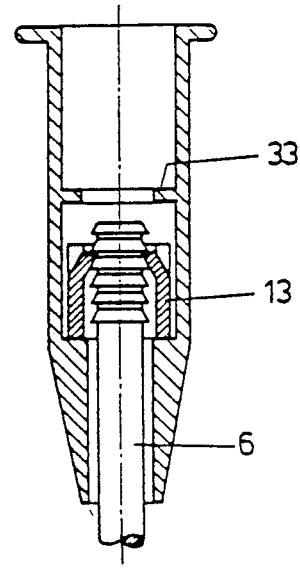

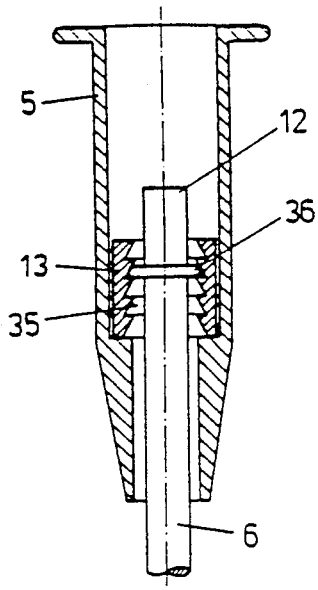
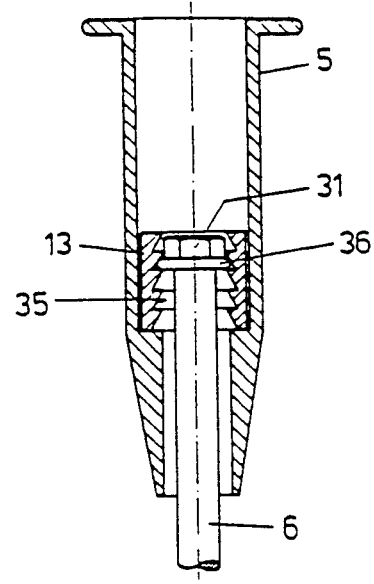
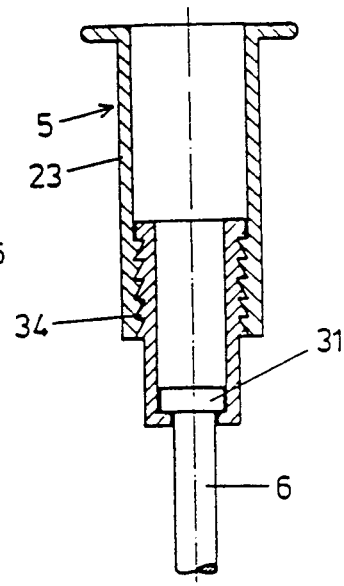
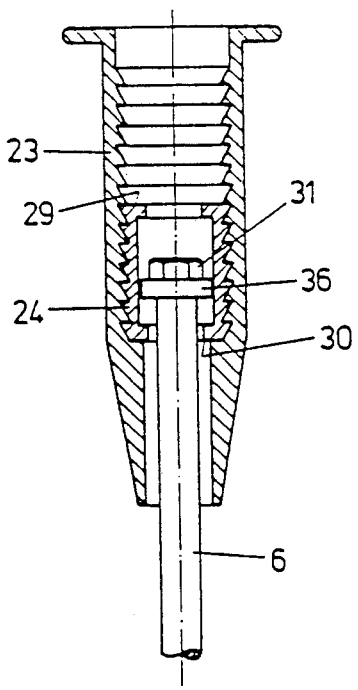
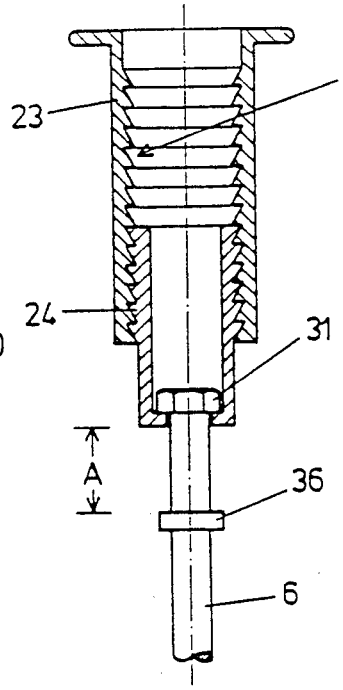
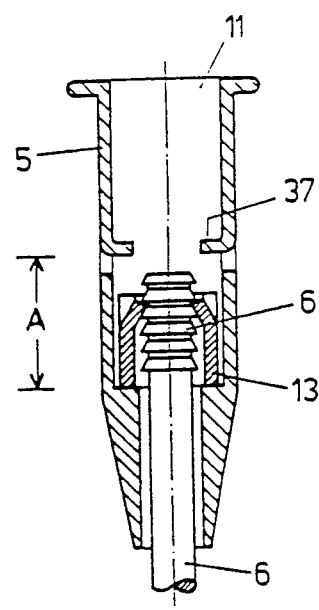

FASTENING ELEMENT FOR THE MOUNTING OF INSULATING STRIPS AND/OR PLATES ON A SOLID SUBSTRUCTURE

BACKGROUND OF THE INVENTION

The invention concerns a fastening element for the mounting of insulating strips and/or plates on a solid substructure with a large surface washer and a tube-shaped extension, for the penetration, the guidance, and the mounting of a fastener, which penetrates into the solid substructure.

Such fastening elements are utilized for the mounting of insulating materials on solid backing, as for example for the mounting of insulating plates on roofs. If materials must be transported onto the roof, it can happen that, for example, a worker steps onto a washer or in its close vicinity, or that a vehicle or tool is moved over the washer. Such locally limited forces can cause the free end of the fastener to penetrate through the applied insulation material, or that the washer penetrates the roof shingles, which are attached to the insulation material. Another variation has been suggested, in which a tube-shaped extension is arranged on the relatively large-surface washer, into which a screw is inserted. The head of this screw lies in this case within the tube-shaped extension and is recessed relatively deeply compared to the upper side of the washer, in which the necessary length of the screw is shortened considerably. The thickness of the insulation material can become a negligible factor because of the interaction between the length of the tube-shaped extension and the length of the screw. In connection with this, it already has been suggested to produce the washer and the tube-shaped extension from two separate parts. In both known variations, the possibility exists that the fastening element can be shortened in a telescoping manner during application of the corresponding load, which means, for example, if a person steps on the washer.

One disadvantage in those known variations is that a number of fasteners with different lengths, which usually means the length of the screws, is necessary depending on the thickness of the insulating strips and/plates and especially with different thicknesses of the insulating strips on the roof. This is necessary because the head of the screw must adjoin the base of the inner space of the tube-shaped extension and the tube-shaped extension and the washer must be pressed against the upper side of the insulating strip. If it does not matter how far such a screw is inserted into the solid substructure, this becomes a negligible factor. If the solid substructure consists, for example, of concrete plates or wood with a visible sheeting, these screws cannot be inserted too deeply into the solid substructure.

SUMMARY OF THE INVENTION

The invention is based on the task of creating a fastening element with which a relatively large application range in regard to the thickness of the insulating strips is made possible and a subsequent adjustment possibility is created in which the telescoping movement between the fastener and the tube-shaped extension can be executed.

According to the invention, this is obtained by the fact that the distance which is formed by the tube-shaped extension and the section of the fastener that protrudes over the same is adjustable by a nonpositive and/or positive adjustable connection between the fastener and a lock element, which is attached on the end that protrudes into its extension, between the fastener and the tube-shaped extension, or between sections of a multisectioned extension.

These measures, according to the invention, assure that the utilized fastening elements can be adjusted to the thickness of the mounted insulating strips and/or plates, and that a subsequent adjustment can be executed if the insulating strip is settling, and that the necessary telescoping movement between the fastener and the tube-shaped extension can still be executed. It is also possible, depending on the structure of the fastening element, to let the fastener penetrate into the tube-shaped extension to a higher or lesser extent and to lengthen or shorten the tube-shaped extension, in which it is always ensured that the washer is still pressed onto the surface of the isolating strip with the necessary force. A telescoping contraction of the fastening element in a relatively large range is still possible with locally applied forces.

Such a construction can be utilized, independent of whether the fastener is structured as a screw which is inserted into the solid backing, or if it is shaped as a part that can be hammered into a bore, in which the part is always inserted into the solid substructure to the same depth. It does also not matter if the insulating strip is evenly thick over the entire roof, or if it forms a wedge towards the edges of the roof; it is practically possible to always utilize fasteners with the same length, although they don't have to be screwed or hammered into the substructure any further.

Further characteristics and special advantages are described in the following with aid of drawings.

BRIEF DESCRIPTION OF THE DRAWING

FIG. 1 is a cross section through a solid substructure with attached insulating strip and a fastening element according to the invention;

FIG. 2 is a cross section through the tube-shaped extension with inserted fastener, which is illustrated in enlarged form compared to FIG. 1;

FIG. 3 is another variation of the fastener, which is illustrated in enlarged form, compared to FIG. 2;

FIGS. 4 and 5 are a side view and a top view of a special variation of a locking element attached to the fastener;

FIGS. 6 through 29 show differential structural variations of the fastening element as well as details of these fastening elements, in which a nonpositive and/or positive adjustable connection between the fastener and the attached locking element, between the fastener and the tube-shaped extension, or between sections of a multisectioned extension is provided.

DETAILED DESCRIPTION OF THE PREFERRED EMBODIMENTS

Figure 27:
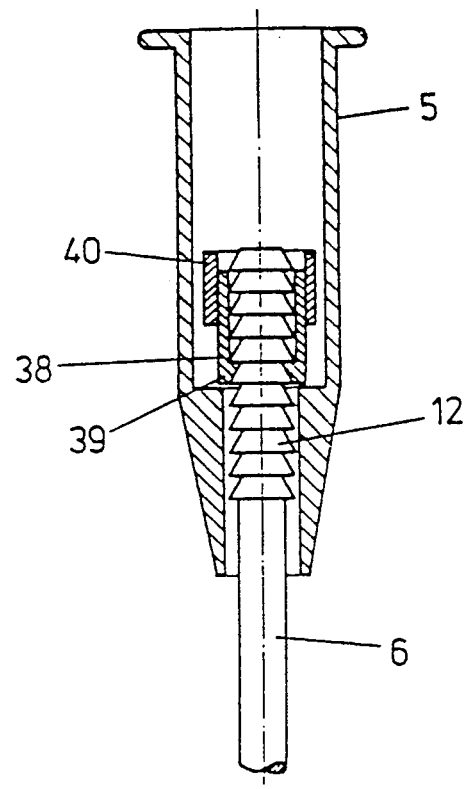
Figure 29:
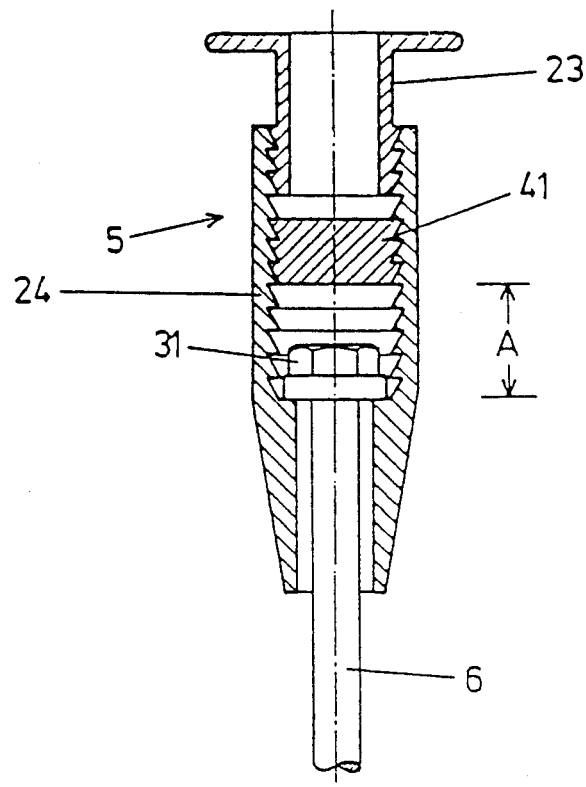

FIG. 1 shows one example of how the insulating strip 1 can be attached to the solid substructure 2. A fastening element 3 is utilized for this purpose, which has a large surface washer 4 with a tube-shaped extension 5. The large surface washer 4 is pressed onto the surface 7 of the insulating strip 1 over the tube-shaped extension 5 by means of the fastener 6, which is inserted into the solid substructure 2. The washer 4 and the tube-shaped extension 5 are preferably constructed of separate parts and can thus consist of different materials. For purposes of presorting it is advantageous if only the fastener 6 and the tube-shaped extension 5 are stored together and the washers 4 are stacked in a separate location. Because the free end area of the fastener penetrates into the tube-shaped extension 5, a telescoping movement between the tube-shaped extension 5 and the corresponding end area of the fastener 6 is possible in such a way that load forces on the washer 4 can be diverted without any problems.

In the example according to FIG. 1, the substructure 2 consists of a concrete plate. Bores 8 are arranged in this plate, into which of the ends 9 of fasteners 6 are hammered. In this special example, the end 8 of the fastener 6 has a generally smooth surface, but shows at least one indentation 10, in which this indentation 10 allows a sufficient positive and nonpositive mounting in the substructure 2 which consists of concrete. A catch collar 11 ensures that the end 9 is always hammered to the same depth of the bore 8, which is especially relevant with relatively thin concrete substructures. Such a structure makes it possible for the fastener 6 to be directly hammered into the substructure 2, which consists of concrete.

These measures, according to the invention, can also be applied with a fastener which is provided with a thread on its end 9 in order to screw the fastener into, for example, a metal or a wooden substructure.

The one end 12 of the fastener 6 penetrates into the inner space 11 of the tube-shaped extension 5, in which a locking element 13 is attached on the end 12 of the fastener 6 within the inner space 11. The fastener 6 is provided with saw-toothed ribs 14 in the free end area 12 in the example according to FIGS. 2 through 5. Depending on the interaction with the locking element, other grooves, elevations, flutings, or recesses can be applied instead of these saw-toothed ribs 14.

In this example, the locking element 13 is structured as a tube-shaped sleeve 15, which is provided with one or more catch elements 16. In our example it is provided with three catch elements which protrude towards the penetration opening.

The locking element 13 can thus be inserted through the upper free opening of the tube-shaped extension 5 into the inner space 11 and can be pushed in the axial direction on the end 12 of the fastener 6, which penetrates into the tube-shaped extension 5. The locking element 13 is pushed far enough on the fastener 6, that the lower side of the locking element 13 rests at the base 17 of the inner space 11 of the tube-shaped extension 5. This means that the washer 4 is pressed onto the surface 7 of the insulating strip 1. If any extraordinary load is applied on the washer 4, the tube-shaped extension 5 can move downward on the fastener 6 in a telescoping manner, in which the tube-shaped extension 5 together with the washer 4 returns to its original position after the load is not applied anymore. If the insulating strip 1 is settling over a period of time, the possibility always exists to push the locking element 13 further onto the free end 12 of the fastener 6 in the axial direction in such a way that the distance L, which is formed by the fastener 6 and the tube-shaped extension 5, can be shortened at any time. However, it is still ensured that the locking element 13 is in such a position on the fastener 6 that it presses onto the washer 4 and the telescoping shortening of the fastener 6 and the tube-shaped extension 5 is still possible.

The example according to FIG. 6 shows a penetration opening 17 in the locking element 13 with inner teeth or an inner thread, which is adapted to the free end 12 of the fastener 6, in which a further penetration opening 18 with smooth surface and a diameter equal or larger than the outer diameter of the fastener 6 crosses the penetration opening 17 in an acute angle. In this variation, the adjustment of the locking element 13 in axial direction of the fastener 6 is possible by tilting, in which the locking element 13 returns to the transverse position in relation to the length axis of the fastener 6. Afterward it is released and thus again obtains the locking connection.

The examples according to FIGS. 7 through 9 show two different variations. The one variation according to FIG. 8 shows that the locking element 13 is provided with hardened inner teeth 19, and is attached to a corresponding fitting on the smooth end area 12 of the fastener 6. This saw-tooth structure of the inner teeth 19 makes movement of the locking element 13 only in the direction towards the end 9 of the fastener 6 possible, so that a sufficient pressure of the washer is ensured. In this example, any subsequent adjustment of the tension is still possible and the telescoping shortening of the fastening element can also be guaranteed.

In the second example, according to FIG. 7, which is shown in more detail in FIG. 9, the locking element 13 shows two or more grooves in the walls 20 of its penetration bore, into which snap rings 21 are inserted. The end area 12 of this fastener 6 also shows a smooth surface, in which a sufficient nonpositive mounting of the locking element 13 on the end area 12 of the fastener 6 is ensured. On the other hand, a corresponding adjustment and subsequent adjustment possibility for the locking element 13 is still possible.

The example according to FIG. 10 utilizes a fastener 6 similar to that shown in FIG. 3. In this case, however, the saw-toothed ribs 14 are somewhat different. In this example, the locking element 13 is constructed as a ring-shaped part which is either elastically expandable or is provided with a lengthwise slot. This makes it possible that the locking element 13 can be moved over the next corresponding saw-toothed rib 14 in order to bring the locking element 13 into the predetermined locking position. This variation furthermore shows another construction variation in broken lines. In this case it would be possible to provide a catch collar 22 on the fastener 6 behind the end area 12, which is provided with the saw-toothed ribs 14. This catch collar would limit the telescoping movement between the tube-shaped extension 5 and the fastener 6.

The example according to FIG. 11 shows that the tube-shaped extension consists of two coaxially overlapping sleeve parts 23 and 24, which are connected positively and/or nonpositively, but are adjustable toward each other in the axial direction. In the example according to FIG. 11, the two sleeve parts 23 and 24 penetrate each other in a correspondingly shaped fitting so that the generally smooth surfaces are pressed against each other nonpositively. With this example it is possible to lengthen and shorten the entire length of the area of the fastening element, which penetrates into the solid substructure 2. In this case, this is done by how far the two sleeve elements 23 and 24 of the extension 5 are pushed within each other.

FIG. 12 shows a similar variation to the one in FIG. 11, but the two sleeve parts 23 and 24 are provided with saw-toothed ribs 24 or corresponding grooves 26 on those surfaces, which oppose each other. This allows a catch-like adjustment possibility.

According to FIG. 13, the interlocking between the two sleeve parts 23 and 24 of the extension 5 is executed positively and/or nonpositively. FIG. 13 shows two different variations. The right half of the figure shows a variation which functions similarly to the one in FIG. 9. In this case, however, the inner wall of the sleeve part 23 is provided with a groove into which snap rings 21 are inserted, which in turn adjoin nonpositively on the surface 27 of the sleeve part 24. The left half of FIG. 13 shows basically the same arrangement of the snap rings 21, in which, however, the sleeve part 24 has several indentations that have a certain distance from each other, such that a catch-like adjustment between the single sleeve parts 23 and 24 is made possible.

In the example according to FIG. 14, an inner sleeve part 24 is provided, which can be inserted into the outer sleeve part 23 of the tube-shaped extension 5, in which this inner sleeve part 24 is provided with inwardly directed catches 29 and 30 on both ends. These sleeve parts 23 and 24 in turn interlock with saw-toothed ribs 25 and corresponding grooves 26, in which the two catches 29 and 30 serve to limit the movement of the extension 5 in relation to the fastener 6. In this example, the fastener 6 shows a head 31 which is guided within the sleeve part 24. The axial movement A serves to balance the load application on the fastening elements. If however the insulation strip should settle, the possibility still exists to shorten this distance A by simple application of force onto the fastening element. In this example, either the head 31 of the fastener 6 adjoins the upper catch 29 or a corresponding catch collar 22 on the fastener adjoins the lower side of the sleeve part 24 in the area of the catch 30. The sleeve part 24 is thus pushed further into the sleeve part 23 in such a way that the original positioning occurs, in which the head 31 adjoins the lower catch 30 and thus presses the washer onto the upper surface of the insulating strip. This means that the telescoping movement during corresponding load application is still ensured.

In the examples according to FIGS. 15 and 16, a locking element 13 in the form of a ring-shaped sleeve is provided, which is in turn provided with inner teeth for the easier interlocking of the next rib 14 with a lengthwise slot 32. In this example, the tube-shaped extension shows an inner catch collar 33 which is directed towards the inner space 11 and limits the movement A of the locking element 13 on the fastener 6. In this case, easy subsequent adjustment of the locking element 13 can be achieved as soon as this locking element adjoins the catch collar 33. The locking element 13 is pushed further onto the free end 12 of the fastener by simply stepping on the fastening element.

The examples according to FIGS. 17 and 18, show the same construction as the ones in FIGS. 11 and 12, in which, however, in this example the inner space 11 of the extension 5 is provided with a catch collar 33. This again limits the axial movement between the fastener 6 and the tube-shaped extension 5, in which the catch is obtained by the head 31 on the fastener 6 in such a way that the two sleeve parts 23 and 24 of the tube-shaped extension 5 are pushed into each other in the axial direction during corresponding force application onto the fastening element. The movement A has to be adapted according to the conditions, because the telescoping adjustability should be measured according to the thickness of the applied insulating strip and the expected loads on the same. Instead of the catch collar 33 on the extension 5, a catch collar 22 can be provided on the fastener 6, which also limits the movement A in the axial direction. As soon as the bottom 34 of the tube-shaped extension 5 adjoins this catch collar 22, a further insertion of the two sleeve parts 23 and 24 of the tube-shaped extension 5 can be achieved by corresponding load application on the fastening element.

Instead of the catch collars 33, or 22 respectively, it would also be possible to provide one or more catch latches.

FIG. 19 shows that the fastener 6 can also be provided with a head 31 that looks like a screw head, in a construction that is otherwise equal to the one in FIG. 3, in such a way that the fastener 6 is equipped with a screw thread which is inserted into the solid substructure of metal or wood.

The example according to FIG. 20, shows a locking element 13 with inner ribs 35, with which a collar 36 interlocks at a distance from the free end 12 of the fastening element. The saw-toothed ribs 35 in this locking element 13 point in the opposite direction of the saw-toothed ribs in the illustration of the fastener 6 according to FIG. 3, in order to achieve a catchlike adjustment of the locking element 13 on the fastener 6 according to FIG. 20. In connection with this it would also be possible to arrange such a collar 36 at a certain distance below the screw head, which would become especially relevant if the fastener 6 is provided with a thread for insertion into a solid substructure.

FIG. 21 shows another possibility in connection with FIG. 20. In this case, the lower part of the head 31 of the screw is provided with a collar 36, which protrudes radially over the head 31 and interlocks in the inner teeth 35 of the locking element 13.

FIG. 22 shows an example similar to the ones in FIGS. 12 and 18, in which, however, the sleeve element 24 is considerably shorter compared to the sleeve element 23.

FIG. 23 shows an example similar to the constructions according to FIGS. 15, 17 and 18, in which a catch collar 33 is also provided. In this arrangement, the fastener 6 as well as the locking element 13 correspond to the ones shown in FIGS. 3 through 5. In this example, the extent of the coaxial movement is also limited.

In the example according to FIG. 24 a similar effect is achieved, as can be seen in FIG. 14. An inner sleeve part 24 is connected, movably and lockably over saw-toothed ribs, with the outer sleeve part 23, in which the head 31 of the fastener 6 is inserted between the two catches 20 and 30 on the ends of this sleeve part 24, and the limitation of the movement is achieved by the collar 36 of the head 31.

FIG. 25 again shows an example which is similar to the ones in FIGS. 12 and 18, in which however the fastener 6 is provided with a head 31 and with a catch collar 36 at a certain distance below this head 31. The movement A between the fastener 6 and the tube-shaped extension 5 is limited by the distance between the head 31 and the catch ring 36. As soon as the inner sleeve part 24 adjoins the catch collar 36 during mounting of the fastening element, a subsequent attachment between the two sleeve parts 23 and 24 is achieved, thus shortening the tube-shaped extension 5.

FIG. 26 shows a further possibility of how the movement A can be limited in axial direction. In this case, latch-like parts 37 are arranged in the walls of the tube-shaped extension 5 within the inner space 11 of the tube-shaped extension 5, which limit the movement direction of the locking element 13 that is attached to the fastener 6, towards the upper end. During corresponding load application on the fastening element these latches 37, which are bent towards the inside, achieve a subsequent movement of the locking element 13 in the axial direction of the fastener 6.

Figure 28:
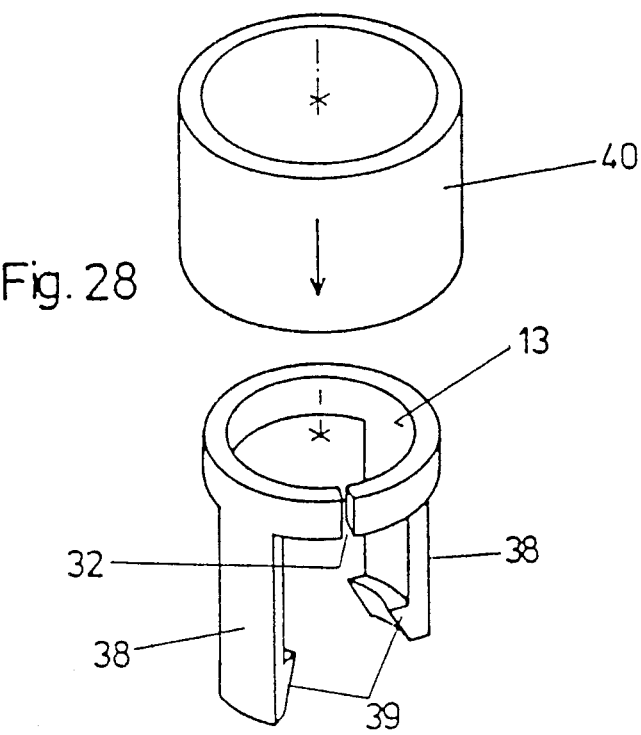

FIGS. 27 and 28 show an example in which the locking element 13 is constructed as a tube-shaped sleeve with two latches 38 that protrude in the axial direction and on whose free ends catch elements 39 are arranged, which are directed toward the penetration opening. In this special example, the latches can be pushed toward the outside in such a way that the catch elements 39 can interlock in the corresponding position at the free end area 12 of the fastener 6. If so desired, it is also possible to separate this fastening element by a lengthwise slot 32 in such a way that a widening in the circumferential direction is possible. In order to ensure the safe mounting of this locking element 13, a sleeve 40 is provided, which can be pushed over the locking element 13 in the axial direction and thus surround it coaxially. This means that the latches 38 with the catch elements 39 cannot be removed from their locking position. It would also be possible to provide only one latch 38 with a catch element 39 or to provide more than two such latches 38 with catch elements 39.

In the example according to FIG. 39, the movement A for the telescoping adjustment of the fastening element is formed by a stopper 41 which can be inserted into the tube-shaped extension 5 and which is held positively and/or nonpositively by the inner walls of the tube-shaped extension 5, but is adjustable in the lengthwise direction of the tube-shaped extension 5. If the tube-shaped extension 5 consists of two sleeve parts 23 and 24, a simple subsequent adjustment possibility for the shortening of the total length of the fastening element is created.

The tube-shaped extension, or the two sleeve parts of the same, and the locking element 13 are preferably made of plastic. However, it would also be possible to utilize corresponding metal parts, which parts can be provided with lengthwise slots, depending on the necessary elastic widening potential. The shown examples can not only be applied if the washer 4 and the tube-shaped extension 5 are formed of two separate parts, but also if the washer 4 and the tube-shaped extension 5 are manufactured in one piece.

Especially if the fastener is provided with an insertion thread, it is advantageous that the locking element 13 be held in the tube-shaped extension in such a way that it is secured against turning and that the tube-shaped extension is connected with the washer 4 in the same manner. This ensures that the fastener will not come loose, and axial movement is not influenced at all. This can be achieved, for example, by the fact that a polygonal outer surface of the locking element 13 approximately corresponds with the profile of the inside of the tube-shaped extension 5.

Depending on the area and location of application, it could be advantageous if the locking element 13 were provided with corresponding fitting elements for a special tool.

The previous description gave a number of examples, however, the invention is not limited to the shown examples. Several other variations are possible in which the distance that is formed by the tube-shaped extension and the section of the fastener which protrudes over the same can be changed according to the invention. These measures represent a considerable improvement in the mounting of insulation strips and/or plates on a solid substructure.

We claim:

1. Fastening element for fixing insulation sheets or plates on a fixed substructure, comprising a large-surface washer, a fastener, a tubular extension, for the guidance and mounting of the fastener which penetrates into the fixed substructure to be engaged therein and a locking member (13, 24) which is mounted to an end portion of the fastener, said locking member with said end portion protruding into the extension (5), said fastener being inserted in said extension to provide therewith two telescopic elements arranged for a telescopic movement relative to each other, wherein a distance (L) which is formed by the tubular extension (5) and a section of the fastener (6) that protrudes beyond the extension is adjustable by adjusting means providing between one of said telescopic elements and said locking member an adjustable connection selected from the group consisting of a frictional connection and a positive releasable connection, said adjusting means including locking elements provides on one of said telescopic elements, and engaging elements provided on said locking member and cooperating with said locking elements to ensure interlocking of said one telescopic element with said locking member in a desired adjusted position.

2. The fastening element according to claim 1, wherein said one telescopic element provided with said locking elements is said fastener.

3. The fastening element according to claim 1, wherein said one telescopic element provided with said locking elements is said tubular extension.

4. The fastening element according to claim 1, wherein said locking elements are selected from the group consisting of ribs, grooves, corrugations, projections, identations, and elastically resilient lugs constructed for a reciprocal engagement with said engaging means.

5. The fastening element according to claim 2, wherein said locking member is a tubular sleeve (13) and said engaging elements are elastically resilient projections (39) projecting towards an inner opening of said sleeve.

6. The fastening element according to claim 2, wherein said locking member is a tubular sleeve (13) and said engaging elements are resilient lugs (16) deflected towards an inner opening of said sleeve.

7. The fastening element according to claim 1, wherein said locking member is a tubular member (13) having on an interior surface thereof a hardened toothing (19) mounted with a fit on said end portion (12) of said fastener.

8. The fastening element according to claim 1, wherein said locking member (13) has on an external wall thereof at least two circular grooves into which spring rings (21) are inserted.

9. The fastening element according to claim 1, wherein said engaging elements of the locking member (13) are formed by an interior toothing (35) into which a flange (36) forming sand locking elements and provided beneath a screw head (31) of the fastener (6).

10. The fastening element according to claim 1, wherein said engaging elements of the locking member (13) are formed by an interior toothing (35) and said locking elements are formed by an annular stop flange (36) arranged at a distance from an end of said fastener.

11. The fastening element according to claim 1, wherein said locking member (13) has a first passage opening (17), an internal thread cooperating with said end portion (12) of the fastener (6), a further passage opening (18) having a smooth surface and a diameter at least equal to an external diameter of the fastener (6), said further passage crossing the first passage opening (17) at an acute angle.

12. The fastening element according to claim 1, wherein said locking member (13) has an elongated slot (32) passing through the whole length thereof.

13. The fastening element according to claim 1, wherein a sleeve (40) is placed on the locking member (13).

14. The fastening element according to claim 1, and further comprising stops on said fastener, said locking member and said tubular extension for limiting a displacement distance (A) between the fastener (6) and the tubular extension (5).

15. The fastening element according to claim 1, wherein said fastener includes a stop flange (22) provided at a distance from an end of the fastener inserted into said extension, said fastener having a head (31) which together with said stop flange limit a displacement distance (A) between said fastener and said extension.

16. The fastening element according to claim 1, wherein said tubular extension (5) has on an interior wall thereof a circular stop flange (33).

17. The fastening element according to claim 1, wherein said locking member is formed as a stopper (41) providing a displacement distance (A) of the fastener (6) in the tubular extension (5), said stopper (41) being insertable into the tubular extension (5) so as to be adjustable in a longitudinal direction thereof.

18. The fastening element according to claim 1, wherein the tubular extension (5) and said locking member are formed of two sleeve parts (23, 24) which coaxially overlap one another and which are connected to each other so as to be adjustable in an axial direction of said extension.

19. The fastening element according to claim 1, wherein said fastener has a head and wherein said locking member is formed by an inner sleeve part (24), and said extension is formed by an outer sleeve part (23) receiving said inner sleeve part, said locking member having at both ends thereof inwardly directed stops (29, 30) to limit a displacement distance (A) for a stop flange (22, 36) of the fastener (6).

20. The fastening element according to claim 1, wherein the fastener (6) has a stop flange (42) adjoining a section (9) of the fastener which is insertable in the fixed substructure.

21. The fastening element according to claim 1, wherein the locking member (13) is held in the tubular extension (5) so as to be secured against rotation and the tubular extension (5) is connected to the washer (4) so as to be secured against rotation.

22. The fastening element according to claim 21, wherein the locking member has a polygonal exterior which approximately corresponds to a cross-section of the interior of the tubular extension (5).

23. The fastening element according to claim 1, wherein the locking member (13) is provided with attachment elements for a tool.

* * * * *